United States Patent [19]

Hori

[11] 4,338,837
[45] Jul. 13, 1982

[54] CUTTING APPARATUS

[75] Inventor: Shinichi Hori, Amagasaki, Japan

[73] Assignee: Asada Machinery Manufacturing Co., Ltd., Amagasaki, Japan

[21] Appl. No.: 148,912

[22] Filed: May 12, 1980

[30] Foreign Application Priority Data

May 28, 1979 [JP] Japan ................................. 54-66521

[51] Int. Cl.³ ............................................ B23D 25/04
[52] U.S. Cl. ...................................... 83/319; 83/311; 83/320; 83/37
[58] Field of Search ................... 83/295, 319, 320, 37, 83/311, 318

[56] References Cited

U.S. PATENT DOCUMENTS

| | | | |
|---|---|---|---|
| 2,416,653 | 2/1947 | Stevens et al. | 83/318 X |
| 4,103,575 | 8/1978 | Utsui et al. | 83/320 X |
| 4,149,438 | 4/1979 | Hori | 83/320 X |
| 4,196,645 | 4/1980 | Shimizu et al. | 83/320 X |

Primary Examiner—Donald R. Schran
Attorney, Agent, or Firm—Gabriel P. Katona

[57] ABSTRACT

A cutting apparatus for cutting into suitable lengths a shaped, elongated bar-like workpiece, such as a section bar of steel, which is being fed in continuously. The apparatus comprises a crank mechanism driven by a single, multi-function drive source and adapted to perform the functions of four devices simultaneously, in a timed relation, namely, a device for reciprocating a cutter in the direction of travel of the workpiece, a device for advancing and retracting the cutter relative to the workpiece, a device for driving a clamp which holds the workpiece during the cutting operation. The apparatus includes a cross type universal joint.

10 Claims, 9 Drawing Figures

CUTTING APPARATUS

BACKGROUND OF THE INVENTION

The present invention relates to a rotary type cutting apparatus for cutting a linearly fed in shaped, elongated bar-like workpiece, such as a section bar of steel, into desired lengths by a cutter which is being reciprocated while it is being rotated by and around the axis of a crank mechanism, and more particularly it relates to improvements in the apparatus disclosed in U.S. Pat. No. 4,149,438.

In order to cut a workpiece, which is being fed in continuously and linearly without a stop by a cutter, it is necessary that the cutter travel in harmony with the feed rate of the workpiece.

In U.S. Pat. No. 4,149,438 issued to the same inventor as in the present application, the control of the angular velocity of the cutter has been performed solely by electrical control means.

SUMMARY OF THE INVENTION

The principle object of the invention is to perform that control mainly by mechanical means, thereby minimizing the required amount of control of the rotative speed of the cutter driving motor to greatly reduce the load on the motor.

Another object of the invention is to provide a press cutting apparatus of the described type, which is capable of being operated by a single drive source and which does not require the separate or individual provision of means for reciprocating the cutter, means for advancing and retracting the cutter, and means for reciprocating the die.

In a conventional press cutting apparatus, since the rate of downward movement of the cutter for cutting a section bar is substantially constant, the percussive pressure exerted on the cutter upon contact with the section bar is so high as that it acts wear out the cutter in a short time, requiring frequent cutter replacement.

As contrasted therewith, in the present invention, in converting rotary motion of a drive shaft into the linear motion of the cutter by the crank mechanism, the rotative speed of the drive shaft is controlled to sharply reduce the rate of downward movement of the cutter as the latter approaches the section bar, with the result that the percussive pressure exerted on the cutter upon contact with the section bar is extremely low.

Accordingly, a third object of the invention is to minimize wear on the cutter to enable the cutter to withstand a prolonged period of use.

Further, it is known that when the cutter cuts the section bar, shearing heat is produced, also accelerating the wear of the cutter. In order to avoid this, it is preferable to feed cooling water or lubricating oil directly to the cutter, just prior to each cutting operation. In this type of press cutting apparatus, however, since the cutter is generally located just above the die that holds the section bar, there has been the danger of lubricating oil being fed, dripping on the section bar directly thereunder, soiling the section bar and greatly detracting from the value of the end product. Conventionally, the cutter must therefore be used in an oilless condition, resulting in the drawback of further acceleration of the cutter wear.

Accordingly, a fourth object of the invention is to provide an arrangement wherein the cutter and the die mechanism opposed thereto are installed on a slope, preferably at an angle of 45° with respect to the horizontal, and the cutter is disposed above an inclined lubricating oil recovery guide plate rather than just above the die, to assure that the oil fed to the cutter drips directly on the guide plate, thereby enabling the cutting operation to be carried out while feeding oil to the cutter, as before, whereby the wear of the cutter is further reduced.

The invention will be described hereinafter in full detail, with reference to the accompanying drawings, explaining the important objects, features and advantages of the invention, as embodied in an exemplary press cutting apparatus.

DESCRIPTION OF THE PREFERRED EMBODIMENT

Figure 1:
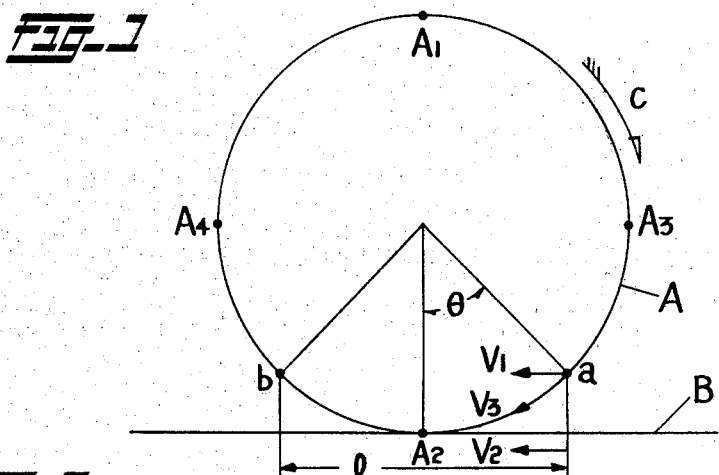
FIG. 1 is a schematic view, illustrating the principle of a rotary type cutting apparatus.
Figure 2:
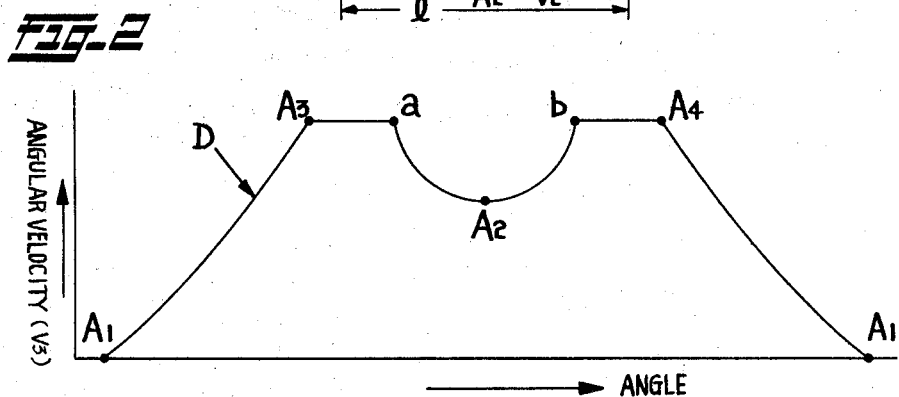
FIG. 2 is a graph illustrating an example of the control of the angular velocity of the cutter of a rotary type cutting apparatus.

A rotary type cutting apparatus with which the invention is concerned is arranged so that, as shown in FIG. 1, the cutter is circumferentially circulated by a crank mechanism connected to a motor while a workpiece B to be cut is linearly passed through and tangentially to the lower dead point A2 on the path of rotation A of the cutter, and that in response to a cutting start signal the cutter waiting at the upper dead point A1 is rotated in the direction of arrow C so that when the cutter reaches the lower dead point A2, the cutter penetrates the workpiece B to cut the same and the cutter is then withdrawn from the workpiece B as it is rotated from the lower dead point A2 toward the upper dead point A1, such operation being repeatedly performed to effect the continuous cutting of the workpiece B into lengths. With such cutting apparatus, it is a matter of course that at the time of cutting of the workpiece B the cutter should make a uniform motion in harmony with the workpiece B in the direction of travel of the workpiece (i.e., in a horizontal direction). Thus, it is necessary that the rotative speed of the motor be variable to effect the synchronous control of the angular velocity V3 of the cutter so that the horizontal velocity component V1 of the cutter which is moving in the portion of the path of rotation A covering the required angle range containing the lower dead point A2 at the middle (corresponding to a clamping duration 1 extending from point a to d point b in FIG. 1) is equal to the traveling speed V2 of the workpiece. A curve D in FIG. 2 illustrates an example of such control of the angular velocity of the cutter. According to this curve D, the angular velocity of the cutter is increased starting at the upper dead point A1 where the cutter begins to rotate, until the cutter reaches the point A3 where its maximum speed is maintained for a while, and then said angular velocity is differentially reduced from the point a to the lower dead point A2, where the cutting of the workpiece B is completed, from which lower dead point A2 it is differentially increased until the cutter reaches the point b where its maximum speed is maintained for a while, and finally the angular velocity is reduced starting at the point A4 until the cutter reaches the upper dead point A1 where it is brought to a stop. Further, the angular velocity V3 of the cutter during the uniform velocity control in the range from point a to point b on said curve D is obtained by the equation V2 1/cos $\theta$, the ideal angular velocity variation curve for the cutter derived from this equation being as shown at E in FIG. 3. In order to effect the control of the angular velocity of the cutter, there may be contemplated an electrical method of angular velocity control comprising detecting the rate of travel of the workpiece B and the angular phase of the cutter, feeding the detected data back to the rotary drive section of the motor, comparing these fed-back values with the rotative speed of the motor, and changing the rotative speed of the motor on the basis of the rate of travel of the workpiece B and the angular phase of the cutter. With such control method, however, since the rotative-speed control range of the motor is large and the speed must be changed sharply, as indicated by the curve E in FIG. 3, the load on the motor involved in said rotative speed control is high, making it sometimes necessary to use a motor whose rated capacity is higher than the required cutting torque. Further, since the rotative speed of the motor has to be controlled over a wide range, even if said control is effected, the angular velocity of the cutter tends to deviate from said ideal angular velocity variation curve E owing to the inertia force of the motor. Therefore, it is necessary to effect said rotative speed control by overcoming the inertia force of the motor, which means that a motor of large capacity must be used in order to control its own inertia force.

The present invention has been accomplished with the above in mind and provides a novel cutting apparatus wherein the angular velocity control of the cutter is effected mainly by mechanical means to minimize the required amount of control of the rotative speed of the motor, thereby greatly reducing the load on the motor.

Figure 3:
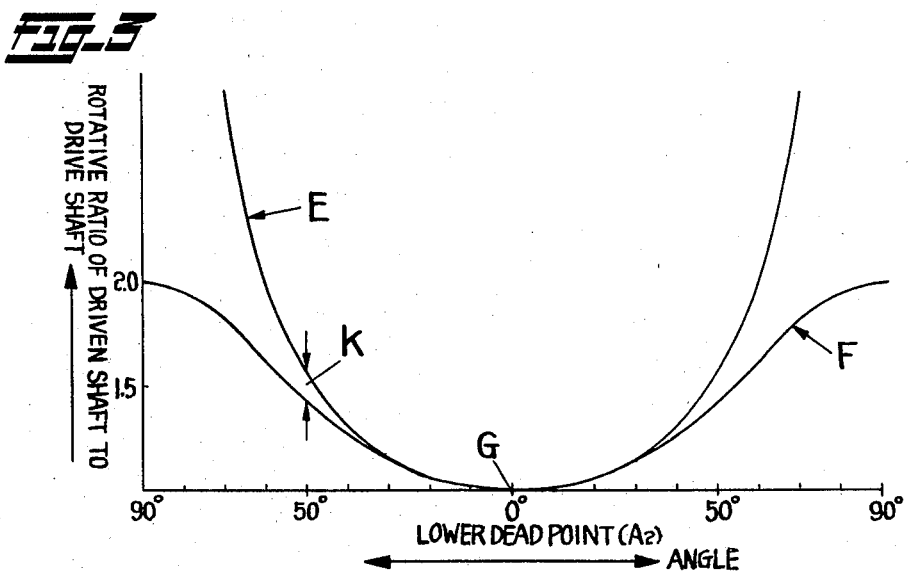
FIG. 3 is a schematic illustration of the principle of the present invention.

More particularly, the principle underlying the invention consists in using a cross type universal joint or Hook's-type universal joint, and placing a drive shaft extending from a motor and a crank shaft for driving a cutter at an angle with each other and operatively connecting said two shafts together by said cross type universal joint, the arrangement being such that the variations in the angular velocity of the crank shaft which are naturally produced during the transmission of torque from said drive shaft to said crank shaft through said cross type universal joint cause the angular velocity of said cutter to vary in such a manner as to closely approximate to the ideal angular velocity variation curve E shown in FIG. 3.

Figure 4:
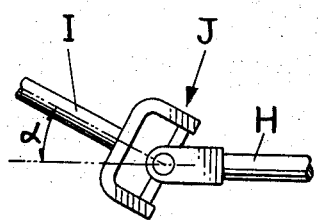
FIG. 4 is a schematic view illustrating an example of usage of a cross type universal joint, serving to illustrate the principle of the present invention.
Figure 5:
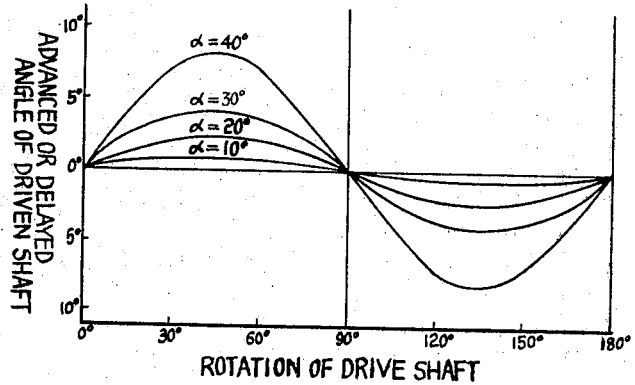
FIG. 5 is a graph illustrating the rate of variation of the angular velocity of a driven shaft in a cross type universal joint.
Figure 6:
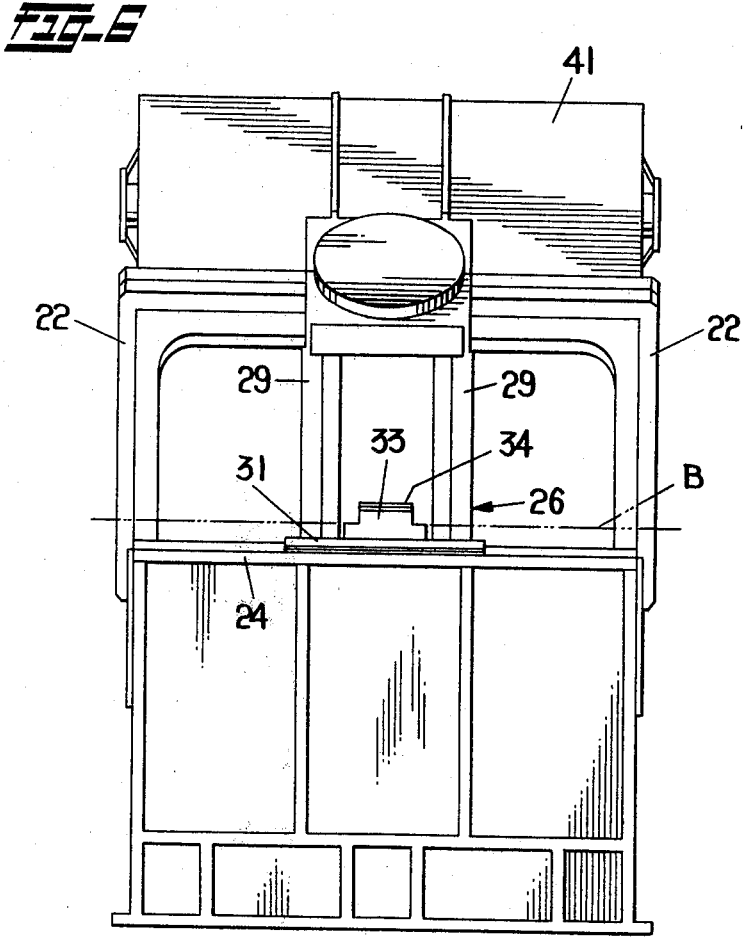
FIG. 6 is a front view of a cutting apparatus according to an embodiment of the invention.

It is known in the art that, of universal joints, a cross type universal joint J including a cross connecting pin which connects a drive shaft H and a driven shaft I, as shown in FIG. 4, has, unlike constant velocity universal joints, such as a ball joint, a nature such that so long as the drive and driven shafts H and I are operatively connected together at an angle $\alpha$, even if the drive shaft H is rotated at a constant angular velocity, the driven shaft I is rotated periodically too fast and too slow, with its angular velocity sinusoidally varying with time. The amount of variation in the angular velocity of the driven shaft I relative to the driving shaft H is obtained theretically by the equation $$\cos \alpha/(1-\sin^2\theta \sin^2\alpha)$$

where $\theta$ is the angle of rotation of the drive shaft H, and the resulting variations are as indicated by the graph of FIG. 5. Therefore, in general, such cross type universal joints J are used in pairs to compensate for variations in the angular velocity of the driven shaft I and it is usual practice to interpose a connecting shaft between a pair of such universal joints to assure that the drive and driven shafts are in phase with each other with respect to rotation. In contrast therewith, according to the present invention, with attention paid to the variations in the angular velocity of the driven shaft in a cross type universal joint system, and directly contrary to the conventional practice of using cross type universal joints in pairs, a single cross type universal joint is used for connecting the drive shaft from the motor to the crank shaft, with the use of said single universal joint producing variations in the angular velocity of the crank shaft with respect to the drive shaft which is rotating at a constant velocity, so that the cutter which is rotating in harmoney with the crank shaft has its angular velocity periodically increased and decreased. With this arrangement, as compared with the ideal angular velocity variation curve E for the cutter shown in FIG. 3, the actual angular velocity variation curve for the cutter appears as at F as a result of the use of the single cross type universal joint. If, therefore, the cutting apparatus is arranged so that the minimum angular velocity of the cutter is equal to the angular velocity (at point G in FIG. 3) on the ideal angular velocity variation curve E which it attains when it reaches the lower dead point, the angular velocity of the cutter will vary close to the ideal angular velocity variation curve E even if substantial rotative speed control is not electrically applied to the motor. Therefore, it is seen that if only a small amount of electrical, rotative speed control is applied to the motor to compensate for the angular velocity difference K between the two curves, the angular velocity of the cutter can be caused to vary according to the ideal angular velocity variation curve E.

To sum up, the present invention consists in operatively connecting the drive shaft from the motor and the crank shaft at an angle with each other by a cross type universal joint interposed therebetween, utilizing variations in the angular velocity which are mechanically and naturally produced in the crank shaft to effect the angular velocity control of the cutter, and compensating for the difference between the angular velocity of the cutter attained by said mechanical control and the angular velocity on said ideal angular velocity variation curve E by the electrical control of the motor so that variations in the angular velocity of the cutter coincide with the ideal angular velocity variation curve E.

Figure 7:
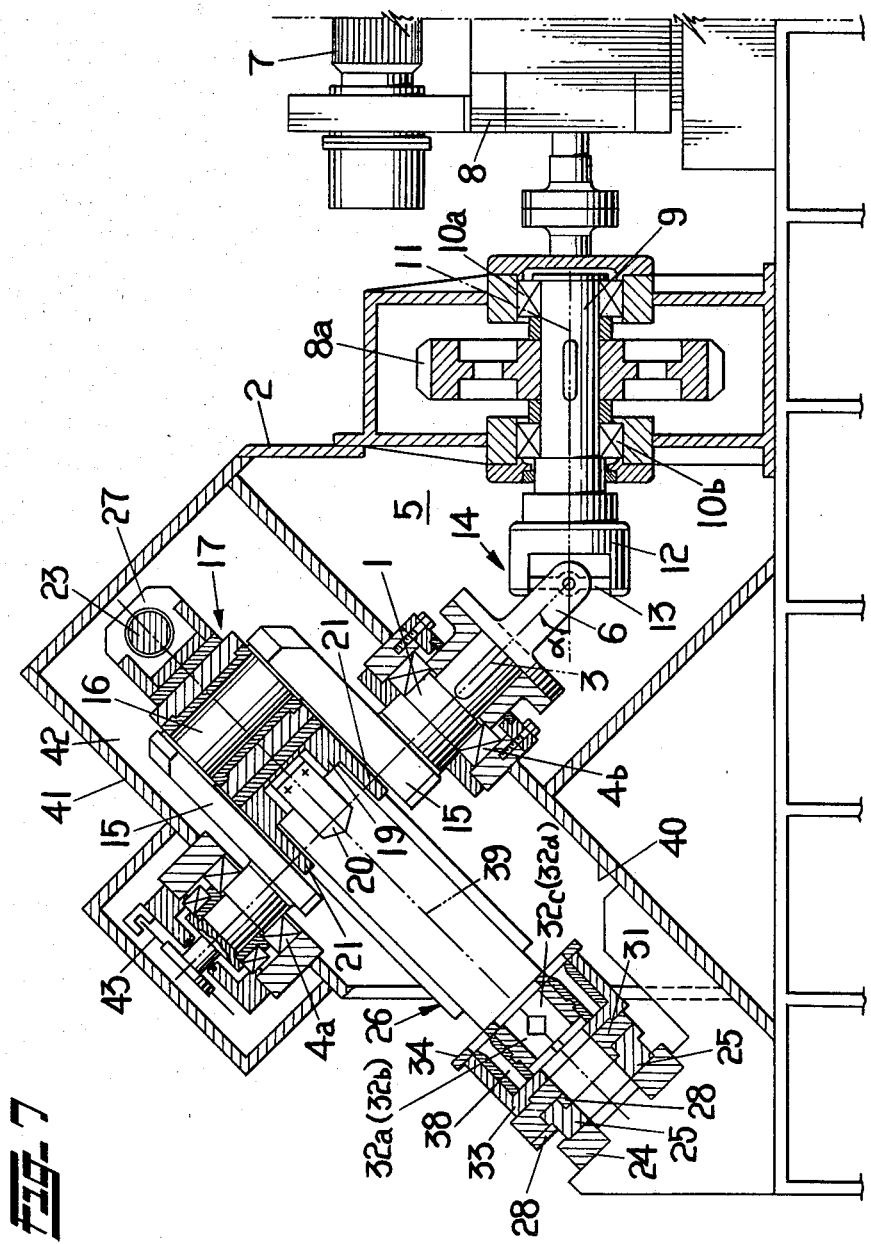
FIG. 7 is a side view, in longitudinal section, of said apparatus.
Figure 8:
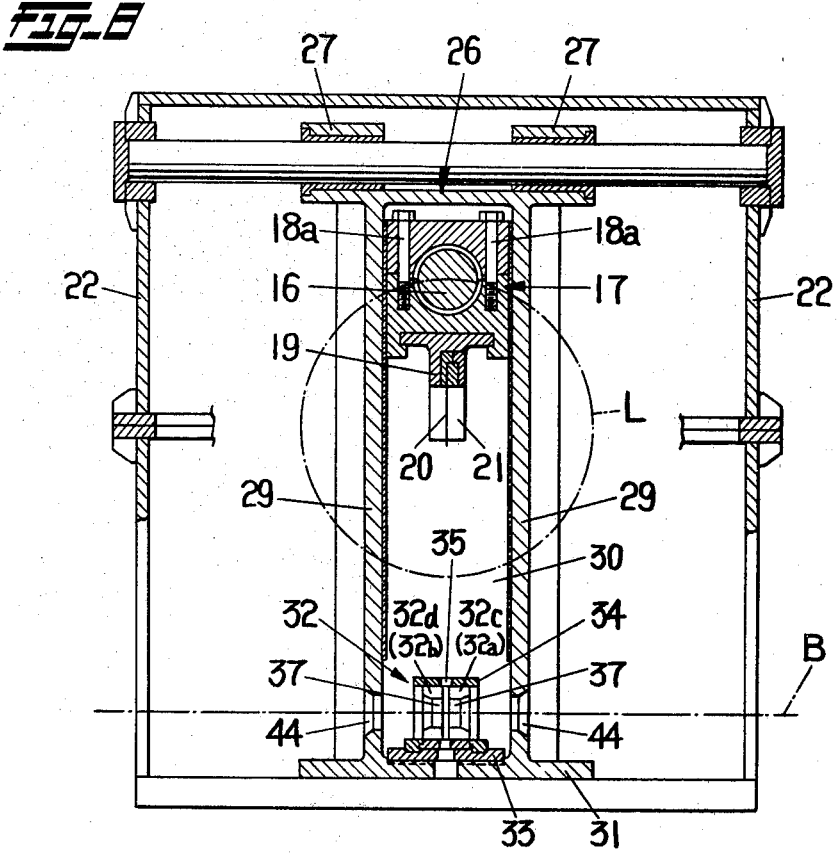
FIG. 8 is a front view, in longitudinal section, of the principal portion of said apparatus.
Figure 9:
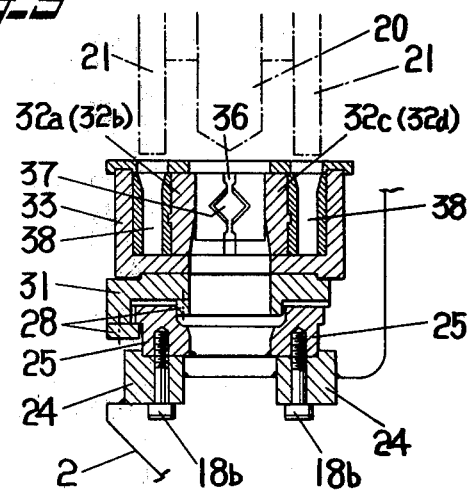
FIG. 9 is a side view, in longitudinal section, of said principal portion.

FIGS. 6 through 9 illustrate an example of the present inventive cutting apparatus constructed on the basis of the above concept. In FIG. 7, the numeral 1 designates a crank shaft supported for rotation in bearings 4a and 4b on a machine frame 2, the axis 3 of said crank shaft being inclined at a required angle, preferably 45 degrees, with respect to the horizontal. One end of said crank shaft 1 projects into an oil tank 5 provided at the machine frame 2, said projecting end being formed with a bifurcated arm 6 for a universal joint. Installed behind the machine frame 2 is a drive unit comprising a motor 8 and a fan motor 7. A drive shaft 9 (output shaft) operatively connected to said drive unit through a gear wheel 8a is supported in bearings 10a and 10b and projects into said oil tank 5 with its axis 11 extending horizontal, said projecting end being formed with a bifurcated arm 12 for a universal joint. The bifurcated arms 6 and 12 of said crank shaft 1 and drive shaft 9 are connected together by a cross connecting pin 13 so that torque may be transmitted. Thus, the crank shaft 1 and the drive shaft 9 are connected together at a required angle a, preferably 45 degrees, by a cross type universal joint 14. A crank pin 16 extending between a pair of crank arms 15 which perpendicularly intersect the crank 1 has a slider 17 rotatably mounted thereon by bolts 18a (FIG. 8) and also has a cutter 20 attached to the lower surface thereof through a cutter attaching seat 19. A pair of clamp members 21 are parallelly dependant from the lower surface of said slider 17 with said cutter 20 disposed therebetween. Installed above the crank shaft 1, as shown in FIGS. 7 and 8, is a guide shaft 23 horizontally extending between opposed lateral walls 22 (FIG. 8). Disposed below said guide shaft 23 is a rail block 25 horizontally fixed to the machine frame 2 by bolts 18b through a support block 24 (FIG. 9). A slide block 26 is horizontally slidably mounted between the guide shaft 23 and the rail block 25 through sleeves 27 at its upper end fitted on the guide shaft 23 and engagement pawls 28 at its lower end engaged with the rail block 25. By fitting said slider 17 in a guide groove 31 defined between vertically extending guide frames 29 (FIG. 8) installed on said slide block 26, the slide block 26 can be horizontally reciprocated in operative association with the up and down movement of said slider 17.

Workpiece gripping dies 32a–32d opposed to said cutter 20 and clamp members 21 are mounted on the lower frame 31 of the slide block 26 through a die attaching block 33 and a die slipping off preventive lid 34, said dies being opposed to said cutter 20 and clamp members 21. Defined between the dies 32a and 32b and between the dies 32c and 32d which are opposed to each other in the direction of feed of the workpiece is a groove 35 for receiving the cutter, while defined between the dies 32a and 32c and between the dies 32b and 32d which are arranged at right angles to the groove 35 are clearances 36 (FIG. 9) for allowing some amount of die movement. Defined between the dies 32a, 32b and 32c, 32d opposed thereto are workpiece receiving holes 37, while defined between the dies 32a, 32b and the die attaching block 33 and between the dies 32c, 32d and the die attaching block 33 are clearances 38 into which the clamp members will be forced.

As the crank shaft 1 is supported with its axis 3 inclined at a required angle, preferably 45 degrees, with respect to the horizontal, the die means 32a–32d and the cutter 20 and clamp members 21 adapted to be lifted and lowered are arranged so that a lifting axis 39 FIG. 7 associated therewith is inclined at a required angle, preferably 45 degrees, with respect to the horizontal. Attached to the machine frame 2 is an inclined lubricating oil recovery guide plate 40 which extends below and parallel to said lifting axis 39. In addition, the numeral 41 designates a front cover for protecting the machine interior 42 and the numeral 43 designates a sensor for detecting the amount of rotation of the crank shaft 1. The sensor is adapted to give a stop signal to the drive unit including the motor 8 when the crank pin 16 returns to the upper dead point as a result of the crank shaft 1 making one complete revolution.

The cutting operation will now be described. As shown in FIG. 8, the workpiece B, such as a section bar, is traveling at all times in the direction of the arrow through a guide hole 44 in the slide block 26 and through the holes 37, while the torque from the drive shaft 9 is transmitted to the crank shaft 1 through the cross type universal joint 14, whereby the crank pin 16 and the slider 17 rotatably fitted thereon are lifted and lowered while describing a circular path L shown in FIG. 8, and concurrently therewith the slide block 26 is horizontally reciprocated. An angular velocity which varies according to the curve F of FIG. 3 described above with reference to the principle of the invention is derived from the cross type universal joint and given to the crank shaft 1, from which it is transmitted to the slide block 26 through the crank pin 16 and slider 17. On the other hand, electrical, rotative speed control for compensating the difference K between the curves E and F of FIG. 3 is applied to the motor 8. As a result, the rate of horizontal travel of the slide block 26 at the time of cutting is controlled to be equal to the rate of travel of the workpiece B. Just before the slider 17 which is descending from the upper dead point reaches the lower dead point, the pair of clamp members 21 projecting from the slider 17 are pressed into the clearances 38 of the dies 32a–32d to somewhat reduce the diameter of the workpiece receiving holes 37 defined between the dies 32a, and 32c, 32d, thereby clamping the workpiece B inserted in said holes 37. Concurrently therewith, the cutter 20 projecting from said slider 17 at right angles thereto between the clamp members 21 is inserted into the groove 35 which is formed midway between the dies 32a–32d and the cutter cuts the workpiece B clamped by the slide block 26 which is moving at the same speed as the workpiece B, said cutting taking place in that the cutter 20 descends until it reaches the lower dead point. Upon completion of the cutting, the cutter 20 and the clamp members 21 are lifted while moving backward in harmony with the travel of the workpiece, while the dies 32a–32d released from the pressure exerted by the clamp members 21 free the workpiece B from the clamp so as not to interfere with the travel of the workpiece. When the crank shaft 1 makes one complete revolution to bring the slider 17 to the upper dead point, the sensor 43 detects the arrival of the slider at the upper dead point and gives a stop signal to the motor 8 to allow the slider to be ready for the next cutting operation. In this connection, it is to be noted that it is, of course, possible to operate the crank mechanism at all times in harmony with the rate of travel of the workpiece, without giving such stop signal, so as to cut the workpiece B into required lengths in a continuous manner.

As has been described so far, according to the invention, the crank shaft and the drive shaft from the motor are operatively connected at a required angle of intersection by a cross type universal joint and variations in the angular velocity of the crank shaft produced by the presence of the intervening cross type universal joint are utilized to mechanically and naturally bring the angular velocity of the cutter close to the ideal angular velocity variation curve. Therefore, as is apparent from FIG. 3, in order to allow the variations in the angular velocity of the cutter to coincide with said ideal angular velocity variation curve, it is only necessary to apply a small amount of electrical, rotative speed control to the motor, so that the load on the motor can be reduced and the cutter can be accurately controlled to follow said ideal angular velocity variation curve, almost without being influenced by the inertia of the motor.

It will be understood by those skilled in the art that various modifications of, additions to and changes in the disclosed particulars are possible, without departing from the spirit and scope of the invention, and these are considered to fall within the scope of the present invention.

What is claimed is:

1. An apparatus for cutting a continuously fed in elongated workpiece into lengths, comprising: die means receptive of the fed in workpiece therethrough; means engageable with the die means for clamping the die means to a workpiece; a cutter; and means mounting the die means, clamping means and cutter for movement in a uniform linear path parallel to the longitudinal axis of the workpiece with the simultaneous movement of the clamping means and the cutter perpendicular to the longitudinal axis of the workpiece to effect the clamping of the die means to the workpiece and the cutting of the workpiece by the cutter without interrupting the movement of the workpiece, the mounting means comprising rotary drive means including a rotary shaft, crank means including a crank shaft disposed at a given angle of inclination with respect to the rotary shaft, a crosstype universal joint operatively connecting the crank means and the rotary drive means with the given angle of inclination to enable the crank means to be driven thereby, a slide block having a guide groove therein and linearly moved by said crank means, horizontally juxtaposed guide members for guiding the slide block during linear movement and a slider linearly moved by said crank means in a direction normal to the direction of movement of said slide block along the guide groove in said block, and wherein the cutter projects from said slider, the clamping means comprises clamp members projecting from said slider on both sides of said cutter and said die means is mounted on said slide block for horizontal linear travel therewith and is clamped by said clamp members.

2. The apparatus according to claim 1, wherein the crank means includes a crank pin and wherein the rotative angle range of the crank pin which extends on both sides of the lower dead point thereof corresponds to the clamping time duration in which the die means is clamped by said clamp members and the time of completion of cutting of the workpiece by the cutter set at the lower dead point of said crank pin.

3. The apparatus according to claim 2, wherein, the cross type universal joint comprises a drive shaft and a driven shaft and is configured such that the crank pin reaches the lower dead point when the rotative speed of the driven shaft is at its lowest relative to the rotative speed of the drive shaft.

4. The apparatus according to claim 3, further comprising an inclined lubricating oil recovery guide plate disposed below the cutter.

5. The apparatus according to claim 2, wherein the horizontal velocity component of the cutter is constant during said clamping time duration.

6. The apparatus according to claim 2, wherein the crank means further comprises a sensor coactive with the crank shaft for emitting a stop signal to the rotary drive means when the crank pin reaches the upper dead point.

7. The apparatus to claim 1, wherein said crank means, said slide block, said cutter clamp members are arranged at a given angle of inclination with respect to the horizontal.

8. The apparatus according to claim 7, wherein said angle of inclination is 45°.

9. The apparatus according to claim 1, wherein said die means comprises a die mount at least four die members mounted on the die mount for movement toward each other and defining holes therebetween for receiving the workpiece being fed in.

10. The apparatus according to claim 9, wherein the die mount and the die members further define holes for receiving the clamp members to clamp the die members.

* * * * *